United States Patent [19]
Barnes et al.

[11] Patent Number: 6,141,368
[45] Date of Patent: Oct. 31, 2000

[54] METHOD OF CONTROLLING LASING WAVELENGTH(S)

[75] Inventors: Norman P. Barnes, Yorktown; Keith E. Murray, White Marsh, both of Va.; Ralph L. Hutcheson, Bozeman, Mont.

[73] Assignee: The United States of America as represented by the Administrator of the National Aeronautics and Space Administration, Washington, D.C.

[21] Appl. No.: 09/078,410

[22] Filed: May 13, 1998

[51] Int. Cl.$^7$ ...................................................... H01S 3/09
[52] U.S. Cl. .............................. 372/69; 372/78; 372/23; 372/32
[58] Field of Search ................... 372/69, 70, 72, 372/78, 29, 32, 23, 41, 25

[56] References Cited

U.S. PATENT DOCUMENTS

| | | | |
|---|---|---|---|
| 4,233,570 | 11/1980 | Emmett et al. | 372/69 |
| 4,337,442 | 6/1982 | Mauck | 372/69 |
| 4,439,861 | 3/1984 | Bradford | 372/70 |
| 4,483,005 | 11/1984 | Smart | 372/25 |
| 4,745,606 | 5/1988 | Uehara et al. | |
| 4,856,012 | 8/1989 | Takenaka | 372/25 |
| 4,930,901 | 6/1990 | Johnson et al. | 372/69 |
| 5,038,358 | 8/1991 | Rand | 372/69 |
| 5,243,615 | 9/1993 | Ortiz et al. | 372/69 |
| 5,272,713 | 12/1993 | Sobey et al. | 372/69 |
| 5,276,695 | 1/1994 | Scheps | |
| 5,325,380 | 6/1994 | Clendening et al. | |
| 5,336,900 | 8/1994 | Peters et al. | |
| 5,345,457 | 9/1994 | Zenzie et al. | |
| 5,381,433 | 1/1995 | Esterowitz et al. | |
| 5,388,112 | 2/1995 | Esterowitz et al. | |
| 5,528,612 | 6/1996 | Scheps et al. | |
| 5,541,946 | 7/1996 | Scheps et al. | |
| 5,742,632 | 4/1998 | Barnes et al. | 372/41 |

*Primary Examiner*—Leon Scott, Jr.
*Attorney, Agent, or Firm*—Helen M. Galus

[57] ABSTRACT

A method is provided to control the lasing wavelength of a laser material without changing or adjusting the mechanical components of a laser device. The rate at which the laser material is pumped with the pumping energy is controlled so that lasing occurs at one or more lasing wavelengths based on the rate. The lasing wavelengths are determined by transition lifetimes and/or energy transfer rates.

17 Claims, 5 Drawing Sheets

METHOD OF CONTROLLING LASING WAVELENGTH(S)

ORIGIN OF THE INVENTION

The invention was jointly made by employees of the United States Government and a contract employee during the performance of work under a NASA contract. In accordance with 35 USC 202, the contractor elected not to retain title.

BACKGROUND OF THE INVENTION

1. Field of the Invention

This invention relates to lasers. More specifically, the invention is a method of controlling the lasing wavelength(s) of a laser material.

2. Description of the Related Art

Having a laser that operates at multiple wavelengths is advantageous for a variety of applications in the fields of medicine, material processing applications such as cutting and welding, remote sensing, communications and holography, just to name a few. For example, in the case of a medical laser device, one wavelength could be strongly absorbed by human tissue and would therefore be used for removing top layers of tissue. Another wavelength might be weakly absorbed and therefore be useful for procedures that required a deeper penetration of the tissue.

Currently, when two such different wavelengths are required, two separate laser devices are employed. However, the cost associated with the purchase and maintenance of two separate laser devices is generally prohibitive. To avoid the purchase of two laser devices, one solution is to use the same basic hardware but change the laser rod, mirrors and power supply when it is necessary to change operating wavelengths. While this reduces the overall cost somewhat, it is a major inconvenience to change the hardware configuration of a laser. Further, the laser must be realigned for operation at the new wavelength. However, realignment of a laser is a task that requires knowledge that may not be readily available to the operator(s) of the laser device.

SUMMARY OF THE INVENTION

Accordingly, it is an object of the present invention to provide multiple wavelength operation from a single laser device.

Another object of the present invention is to provide multiple wavelength operation of a laser device without changing any of the hardware components thereof.

Other objects and advantages of the present invention will become more obvious hereinafter in the specification and drawings.

In accordance with the present invention, a method is provided to control the lasing wavelength of a laser material. Once a plurality of lasing wavelengths of the laser material are identified, a pumping energy is selected. The pumping energy must be sufficient to cause lasing of one of the plurality of lasing wavelengths. The rate at which the laser material is pumped with the pumping energy is controlled so that lasing occurs at one or more of the plurality of lasing wavelengths based on the rate.

DETAILED DESCRIPTION OF THE INVENTION

Figure 1:
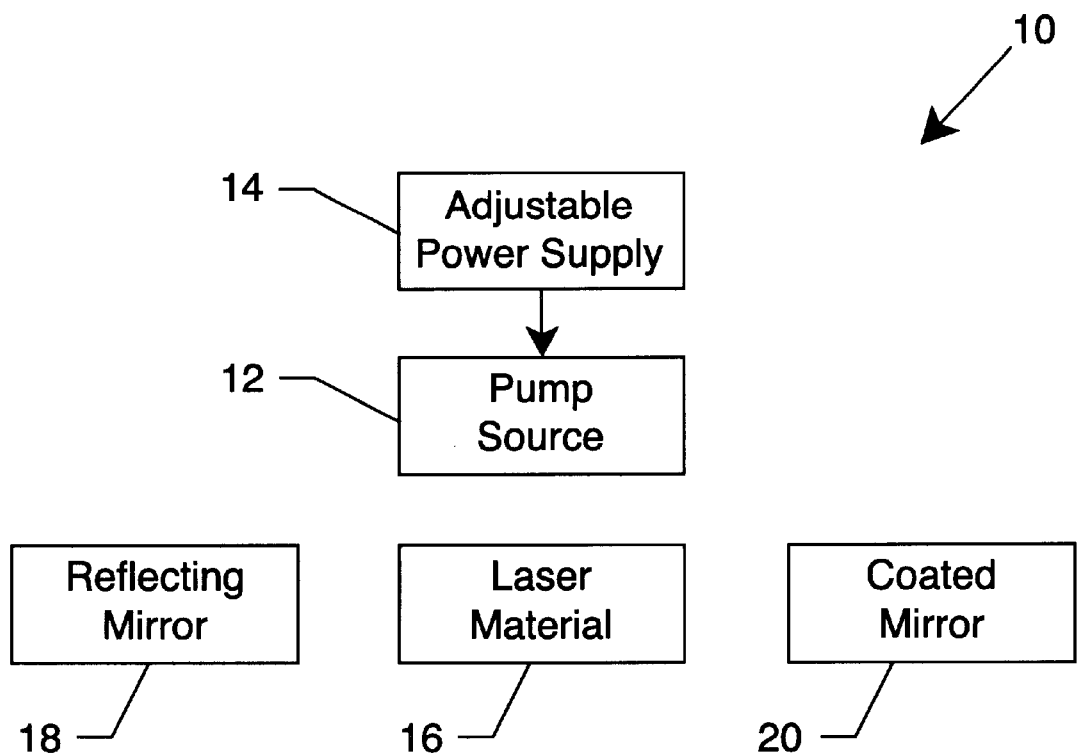
FIG. 1 is a schematic view of a transversely-pumped laser resonator used to carry out the method of the present invention.

Referring now to the drawings and more particularly to FIG. 1, a schematic view of a laser resonator is shown and referenced generally by numeral 10. Laser resonator 10 includes a pump source 12 capable of outputting a selected amount of optical energy over a period of time or rate (as it will be referred to hereinafter) controlled by an adjustable power supply 14. Pump source 12 is configured, for example, to transversely pump a laser material 16.

Laser material 16 is generally of the form X:HOST or X:Y:HOST where X represents one dopant (e.g., Ho, Tm, Er, Cr or other active lanthanide or transition metal elements) and X:Y represents two or more of such dopants. The HOST term represents a laser host (e.g., LuAG, YAG, YSGG, or other oxides or fluoride laser hosts). The dopant(s) are selected such that one or more transition lifetimes and/or energy transfer rates which occur within each transition lifetime are defined by the particular laser material. For example, the dopant(s) could have several transitions with both fast energy transfer rates (i.e., an energy transfer rate favorable to a short-length pump pulse) and slow energy transfer rates (i.e., an energy transfer rate favorable to a long-length pump pulse). The dopant(s) could also define two or more unique transitions having similar or different energy transfer rates. In each case, the dopant(s) are chosen to define more than one lasing wavelength of interest.

Laser resonator 10 is completed by a totally reflective mirror 18 positioned adjacent one end of laser material 16, and a coated mirror 20 positioned adjacent the opposite end of laser material 16. Mirror 20 is coated to transmit those lasing wavelengths of interest defined by the dopant(s).

In general, pump source 12 bombards laser material 16 with optical energy in accordance with a rate set by adjustable power supply 14. The idea is to select which wavelength(s) the laser provides. The amount of pumping energy that must be available is determined by the lasing wavelength having the lowest gain. That is, pump source 12 must be able to supply the threshold energy necessary to bring about lasing at the selected wavelength of interest that has the lowest gain as defined by the dopant(s).

Output from laser resonator 10 at one or more of the lasing wavelengths is governed by the rate at which pump energy is supplied to laser material 16. The rate is controlled to bring about lasing of laser material 16 at a particular one or more of the wavelengths of interest. As will be explained further below, proper rate selection can also cause laser material 16 to lase at all of the wavelengths of interest. Thus, with proper coating of coated mirror 20, laser resonator 10 can produce one or more laser wavelengths without any mechanical changes or adjustments.

By way of example, the method of the present invention will now be described for a laser material 16 where the dopant(s) are Ho:Tm:Er and the host is LuAG. More specifically, a 4.0 mm by 80 mm length rod of Ho:Tm:Er:LuAG was used to evaluate the method of the present invention. Ho:Tm:Er:LuAG defines two different wavelengths, each having a different transition lifetime and associated energy transfer parameter. Ho lases on the $^5I_7$ to $^5I_8$ transition at a wavelength of 2.1 μm (micrometers). Er lases on the $^5I_{11/2}$ to $^4I_{13/2}$ transition at a wavelength of 2.7 μm. Accordingly, coated mirror 20 of laser resonator 10 is constructed to partially reflect and partially pass light of both wavelengths as is known in the art. The output coupling for each wavelength will be determined by the gain of each transition of interest. Laser operation at either or both of these wavelengths can be controlled via the rate of the pumping energy being supplied thereto. The ability to easily change (i.e., electrical changes versus mechanical changes) between the two wavelengths is of particular use in situations where both wavelengths are needed for an application. In the illustrated example, 2.7 μm is very close to the peak absorption wavelength of human tissue and is therefore very useful in removing thin layers of tissue. In contrast, the wavelength 2.1 μm is near a weaker absorption peak and would therefore be useful for procedures requiring deeper penetration into the tissue.

In order to bring about lasing of Ho:Tm:Er:LuAG at one or both of the lasing wavelengths defined by Ho and Er, it is first necessary to select the pump energy that will be used. Once again, the pump energy must be sufficient to bring about lasing at the lowest gain wavelength which in this example is Er at 2.7 μm.

Figure 2:
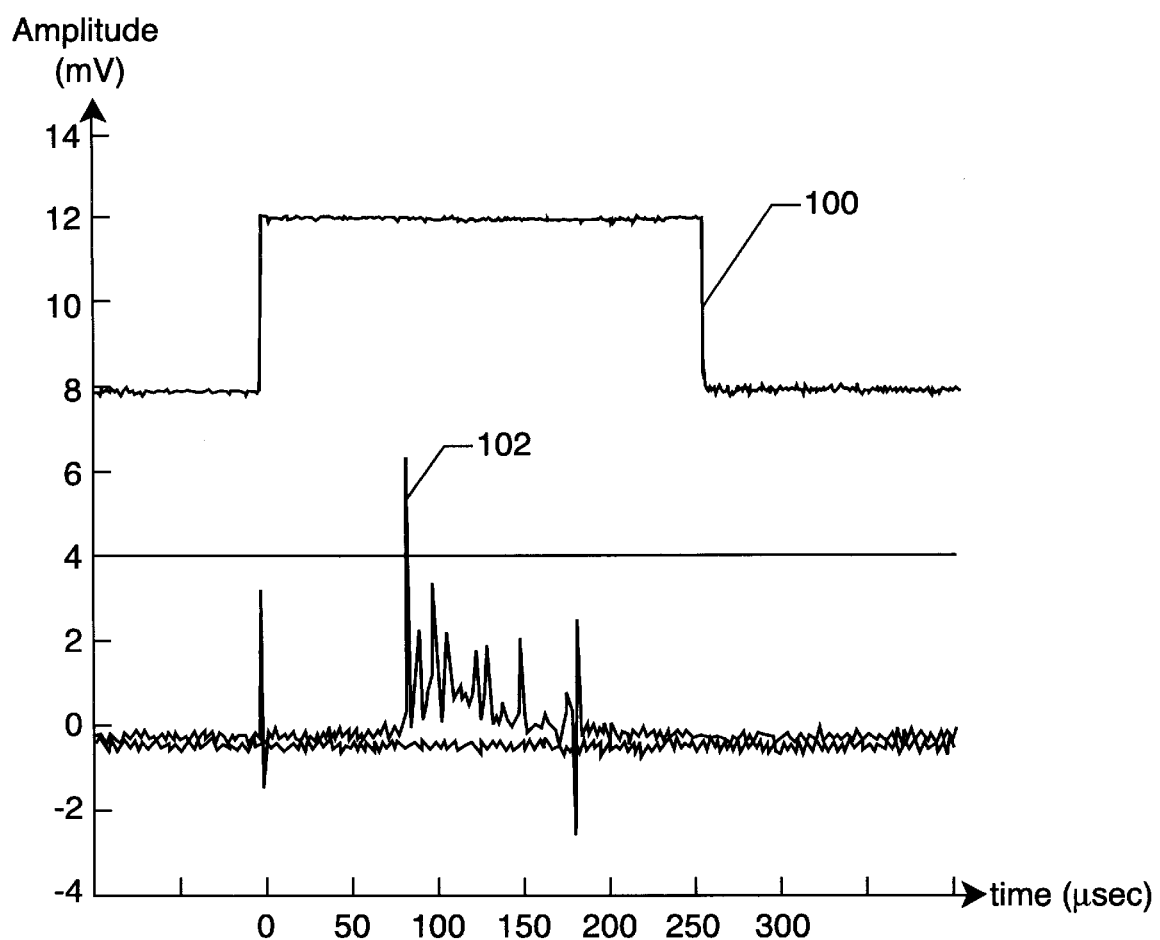
FIG. 2 depicts traces of the pump energy pulse and resulting 2.7 $\mu$m laser pulse of a Ho:Tm:Er:LuAG laser material.
Figure 3:
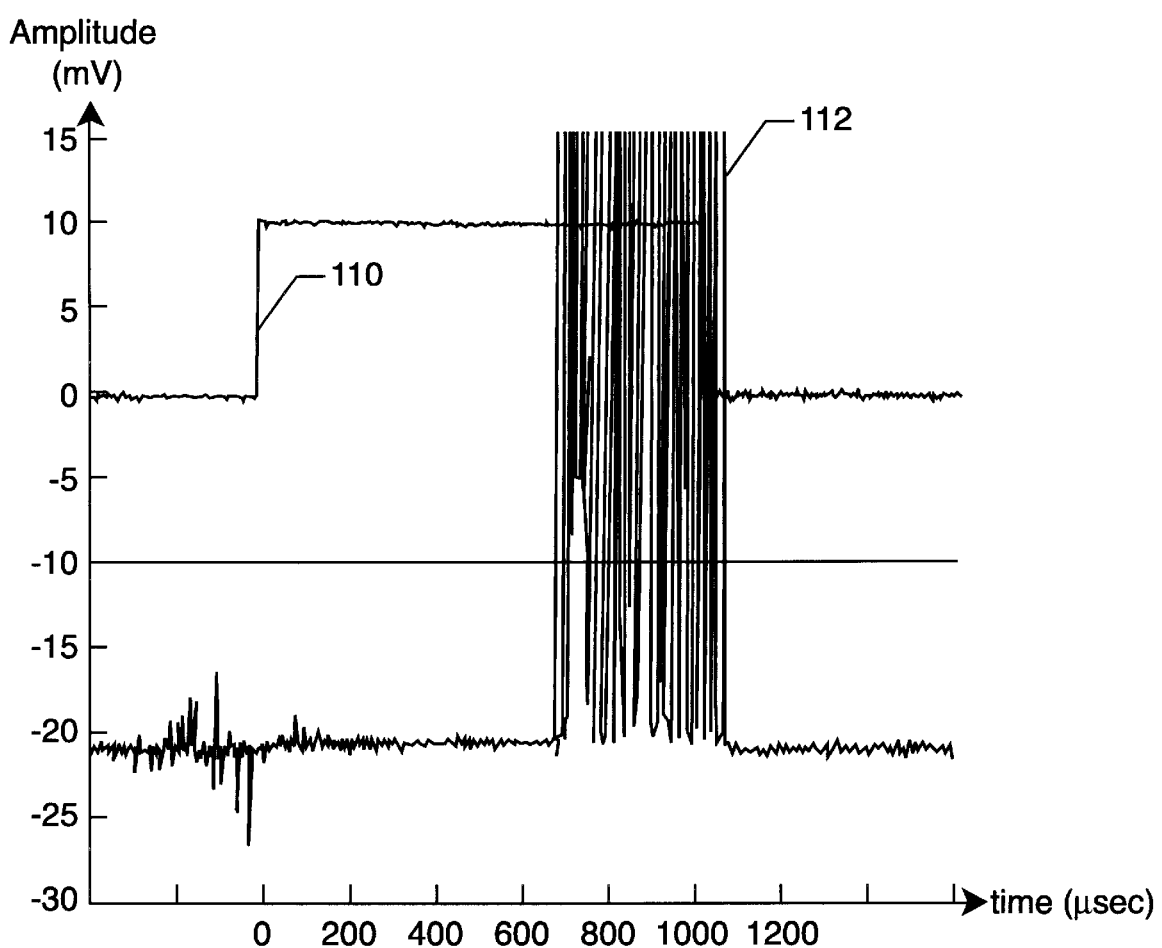
FIG. 3 depicts traces of the pump energy pulse and resulting 2.1 $\mu$m laser pulse of a Ho:Tm:Er:LuAG laser material.
Figure 4:
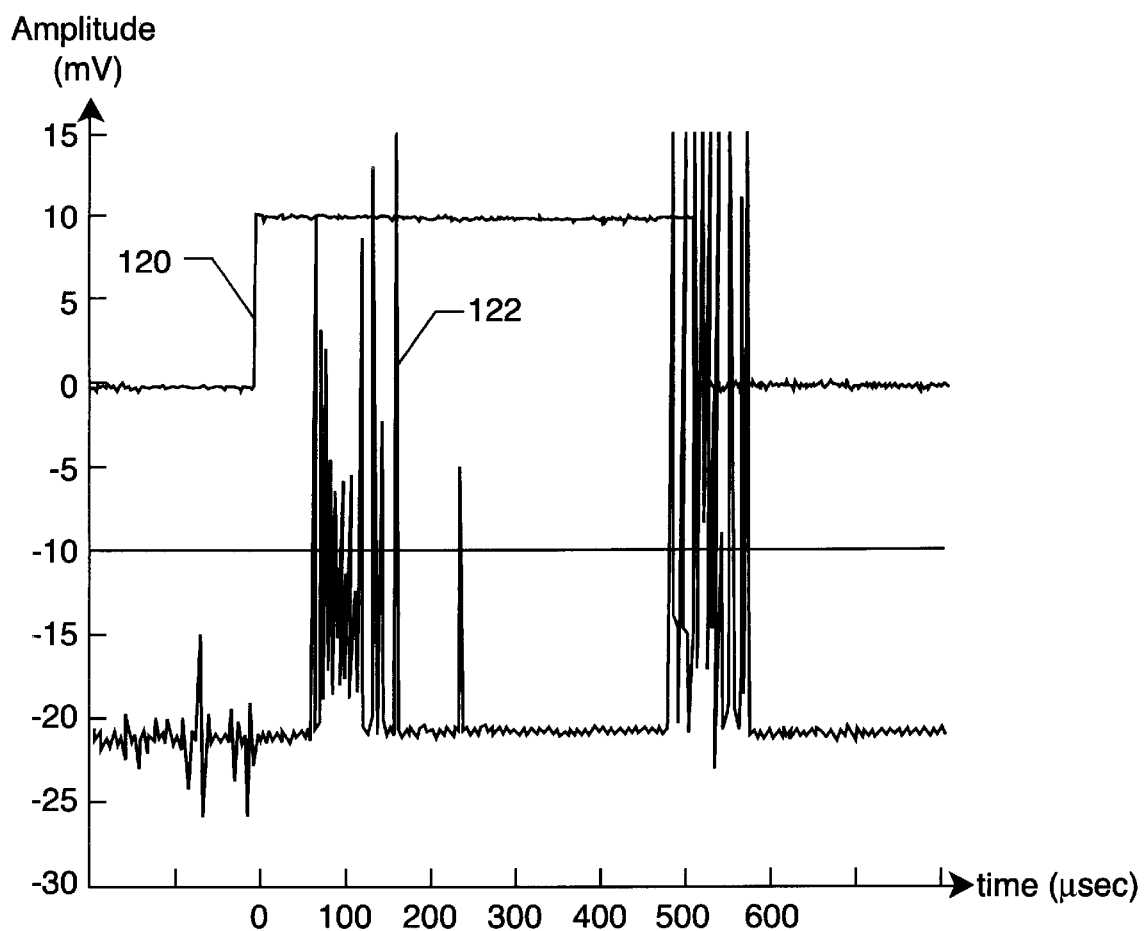
FIG. 4 depicts traces of the pump energy pulse and resulting 2.1 $\mu$m and 2.7 $\mu$m laser pulses of a Ho:Tm:Er:LuAG laser material.

With the pump energy properly selected, power supply 14 can be adjusted to supply pump energy from pump source 12 at a rate that will bring about lasing of Ho:Tm:Er:LuAG at either or both of the 2.1 μm and 2.7 μm wavelengths. Operation at only 2.7 μm can be obtained by supplying the pump energy at a fast rate, that is, over a short pump pulse commensurate with the upper level transition lifetime of the Er $^4I_{11/2}$ to $^4I_{13/2}$ transition as shown in FIG. 2. In FIG. 2, an upper trace 100 shows the pump energy being delivered to the Ho:Tm:Er:LuAG rod over a pump pulse that lasts for approximately 260 μsec. (microseconds). Lower trace 102 shows that lasing at Er's 2.7 μm wavelength commences after approximately 80 μsec at this rate of pumping. In contrast, as shown in FIG. 3, operation at only 2.1 μm can be obtained by supplying the pump energy at a slower rate, that is, over a longer pump pulse commensurate with the upper level transition lifetime of the Ho $^5I_7$ to $^5I_8$ transition. In FIG. 3, an upper trace 110 shows the pump energy being delivered to the Ho:Tm:Er:LuAG rod over a pump pulse that lasts for approximately 1000 μsec. Lower trace 112 shows that lasing at Ho's 2.1 μm wavelength commences after approximately 640 μsec. At this slower rate of pumping, the energy transfer rates of Er's $^4I_{11/2}$ to $^4I_{13/2}$ transition do not create a population inversion and thus no lasing at 2.7 μm is brought about. Operation of laser resonator 10 at both the 2.1 and 2.7 μm wavelengths can also be achieved by adjusting the rate of pumping to an intermediate rate between those used in FIGS. 2 and 3. This result is shown in FIG. 4 where upper trace 120 once again shows the pump energy being delivered to the Ho:Tm:Er:LuAG rod over a pump pulse rate that lasts for approximately 500 μsec. At this intermediate rate of pumping, the energy transfer rates associated with the Er $^4I_{11/2}$ to $^4I_{13/2}$ manifold creates a population inversion. This allows for lasing at 2.7 μm after approximately 80 μsec and lasing at 2.1 μm after approximately 500 μsec as evidenced by laser trace 122. The experimental arrangement and results are described in N. P. Barnes, K. E. Murray, B. M. Walsh, and R. L. Hutcheson, "Ho:Tm:Er:LuAG and Two Wavelength Oscillation," Advanced Solid State Lasers, *Trends in Optics and Photonics*, Vol. 10, 1997, pp. 211–213, herein incorporated by reference.

While the present invention has been described for a particular illustrative example, the method can be extended to a variety of laser materials to include other active atoms besides Ho and Er as well as different laser materials besides LuAG. Specifically, other transitions in any of the lanthanide elements or transition metal elements, such as Tm operating on the $^3F_4$ to $^3F_6$ transition, could be utilized. In addition, any of the active atoms could be incorporated into the laser materials, such as YAG, YSGG, or other oxides or any fluoride laser materials.

In general, the lasing wavelengths are limited to those that can be discriminated by their unique transition lifetimes or unique energy transfer rates within a particular transition lifetime. The pumping rate can be increased (i.e., the duration of the pump pulse is shortened) until lasing occurs at only transitions associated with the fastest energy transfer rate within the shortest transition lifetime. Conversely, the pumping rate can be decreased (i.e., the duration of the pump pulse is lengthened) until lasing occurs at only transitions associated with the slowest energy transfer rate within the longest transition lifetime. The rate can also be adjusted to an intermediate rate to bring about sequential lasing at multiple wavelengths as described above. A single dopant defining multiple energy transfer rates within a transition lifetime could also produce multiple wavelengths in accordance with the present invention. In such a case, the pumping rate could simply be adjusted in accordance with a particular set of the energy transfer rates to promote that transition.

The advantages of the present invention are numerous. Multiple wavelengths can be produced by a single laser system without changing the mechanical configuration thereof. Instead, wavelength control is achieved by merely adjusting the rate at which pump energy is supplied to the laser material. This adjustment can be performed electrically by an operator who does not have to be a skilled laser technician. Thus, the present invention greatly reduces the cost and complexity associated with managing a multiple-wavelength laser application.

Figure 5:
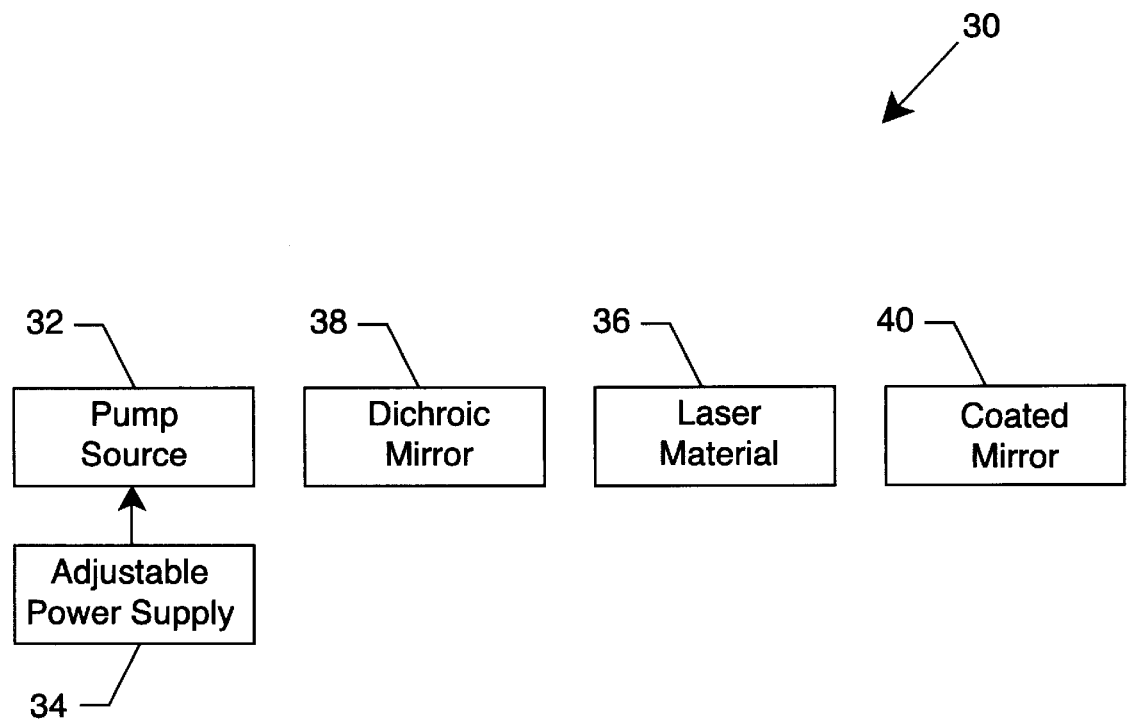
FIG. 5 is a schematic view of a longitudinally-pumped laser resonator for use in the present invention.

Although the invention has been described relative to a specific embodiment thereof, there are numerous variations and modifications that will be readily apparent to those skilled in the art in light of the above teachings. For example, the present method could also be carried out by a longitudinally-pumped laser resonator 30 shown in FIG. 5. Laser resonator 30 uses a pump source 32 positioned at a longitudinal end of laser material 36. Pump source 32 is controlled by means of adjustable power supply 34. A dichroic mirror 38 is positioned between pump source 32 and one longitudinal end of laser material 36 to pass pump energy therethrough while reflecting laser energy back into laser material 36. A coated mirror 40 (analogous to coated mirror 20 in the embodiment illustrated in FIG. 1) is positioned at the opposite end of laser material 36 to permit emission of the wavelengths of interest. It is therefore to be understood that, within the scope of the appended claims, the invention may be practiced other than as specifically described.

What is claimed as new and desired to be secured by letters patent of the united states is:

1. A method of controlling lasing wavelength of a laser material, comprising the steps of:

identifying a plurality of lasing wavelengths of said laser material that are of interest;

selecting a pumping energy sufficient to cause lasing of one of said plurality of lasing wavelengths having the lowest gain; and controlling a rate at which said laser material is pumped with said pumping energy, wherein lasing occurs at at least one of said plurality of lasing wavelengths based on said rate.

2. A method according to claim 1 wherein said step of identifying includes the step of limiting said plurality of lasing wavelengths that are of interest to ones that can be discriminated by transition lifetime and energy transfer rates which occur within each said transition lifetime.

3. A method according to claim 1 further comprising the step of providing a laser resonator for housing said laser material, said laser resonator being configured to permit laser output at said plurality of lasing wavelengths.

4. A method according to claim 1 wherein said step of controlling comprises the step of increasing said rate until said laser material exhibits lasing at one of said plurality of lasing wavelengths having the shortest transition lifetime and the fastest energy transfer rate at the shortest transition lifetime.

5. A method according to claim 1 wherein said step of controlling comprises the step of decreasing said rate until said laser material exhibits lasing at one of said plurality of lasing wavelengths having the longest transition lifetime and the slowest energy transfer rate at the longest transition lifetime.

6. A method according to claim 1 wherein said step of controlling comprises the step of adjusting said rate until said laser material exhibits lasing at all of said plurality of lasing wavelengths.

7. A method of controlling lasing wavelength of a laser material, comprising the steps of:

providing a laser resonator for housing said laser material, said laser resonator being configured to permit simultaneous operation at a plurality of specific wavelengths;

pumping said laser material housed in said laser resonator with optical energy; and controlling a rate at which said step of pumping occurs, wherein lasing occurs at at least one of said plurality of specific wavelengths based on said rate.

8. A method according to claim 7 further comprising the steps of:

configuring said laser material to be capable of lasing individually at each of said plurality of specific wavelengths; and selecting said rate such that lasing occurs sequentially at all of said plurality of specific wavelengths during said step of pumping.

9. A method according to claim 7 wherein said step of pumping occurs transversely to said laser material.

10. A method according to claim 7 wherein said step of pumping occurs at a longitudinal end of said laser material.

11. A method of controlling lasing wavelength of a laser material, comprising the steps of:

identifying a plurality of lasing wavelengths of said laser material that are of interest;

selecting a pumping energy sufficient to cause lasing of one of said plurality of lasing wavelengths having the lowest gain;

providing a laser resonator for housing said laser material, said laser resonator being configured to permit simultaneous operation at said plurality of lasing wavelengths so-selected;

pumping said laser material housed in said laser resonator with said pumping energy; and controlling a rate at which said step of pumping occurs, wherein lasing occurs at at least one of said plurality of lasing wavelengths based on said rate.

12. A method according to claim 11 wherein said step of identifying includes the step of limiting said plurality of lasing wavelengths that are of interest to ones that can be discriminated by transition lifetime and energy transfer rates which occur within each said transition lifetime.

13. A method according to claim 11 wherein said step of controlling comprises the step of increasing said rate until said laser material exhibits lasing at one of said plurality of lasing wavelengths having the shortest transition lifetime and the fastest energy transfer rate at the shortest transition lifetime.

14. A method according to claim 11 wherein said step of controlling comprises the step of decreasing said rate until said laser material exhibits lasing at one of said plurality of normal-mode lasing wavelengths having the longest transition lifetime and the slowest energy transfer rate at the longest transition lifetime.

15. A method according to claim 11 wherein said step of controlling comprises the step of adjusting said rate until said laser material exhibits lasing at all of said plurality of lasing wavelengths.

16. A method according to claim 11 wherein said step of pumping occurs transversely to said laser material.

17. A method according to claim 11 wherein said step of pumping occurs at a longitudinal end of said laser material.

* * * * *